United States Patent
Fujimaki

(10) Patent No.: US 9,557,566 B2
(45) Date of Patent: Jan. 31, 2017

(54) HEAD-MOUNTED DISPLAY DEVICE AND CONTROL METHOD FOR THE HEAD-MOUNTED DISPLAY DEVICE

(71) Applicant: Seiko Epson Corporation, Tokyo (JP)

(72) Inventor: Yutaka Fujimaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 67 days.

(21) Appl. No.: 13/783,746

(22) Filed: Mar. 4, 2013

(65) Prior Publication Data

US 2013/0234914 A1 Sep. 12, 2013

(30) Foreign Application Priority Data

Mar. 7, 2012 (JP) ................................. 2012-050481

(51) Int. Cl.
*G02B 27/01* (2006.01)
*G06F 3/01* (2006.01)

(52) U.S. Cl.
CPC ............ *G02B 27/017* (2013.01); *G06F 3/011* (2013.01)

(58) Field of Classification Search
CPC .............. G02B 27/017; G02B 27/0101; G02B 27/0178; G02B 2027/014; G02B 2027/0138; G02B 2027/0141; G02B 27/0138; G02B 21/362; G06F 3/011; G06F 3/012; G06F 3/013; H04N 13/02; H04N 13/0203; H04N 13/0239; H04N 13/0242; G09G 3/003
See application file for complete search history.

(56) References Cited

U.S. PATENT DOCUMENTS

| 7,898,504 B2 * | 3/2011 | Fischer | .............................. 345/9 |
| 8,311,370 B2 * | 11/2012 | Ha | .......................... G06F 3/0425 345/169 |
| 8,988,397 B2 * | 3/2015 | Naka | ...................... G06F 3/0418 178/18.01 |
| 9,311,883 B2 * | 4/2016 | Cajigas | .................... G09G 5/00 |
| 2004/0070611 A1 | 4/2004 | Tanaka et al. | |

(Continued)

FOREIGN PATENT DOCUMENTS

| JP | 2004-178554 A | 6/2004 |
| JP | 2010-146481 A | 7/2010 |
| JP | 2011-203823 A | 10/2011 |

*Primary Examiner* — Jennifer Mehmood
*Assistant Examiner* — Sardis F Azongha
(74) *Attorney, Agent, or Firm* — ALG Intellectual Property, LLC

(57) ABSTRACT

A head-mounted display device with which a user can visually recognize a virtual image and an outside scene simultaneously includes an image pickup unit configured to pick up an image of the outside scene and acquire an outside scene image, an augmented-reality processing unit configured to analyze the acquired outside scene image and generate additional image data for augmented reality according to a result of the analysis, a display element configured to generate image light using the generated additional image data, and a light guide unit configured to form a virtual image before the eyes of the user using the generated image light. The augmented-reality processing unit acquires an overlapping region where a display region for the virtual image and an image pickup region of the image pickup unit overlap in the outside scene image and generates the additional image data using the overlapping region.

8 Claims, 12 Drawing Sheets

(56) References Cited

U.S. PATENT DOCUMENTS

| | | | |
|---|---|---|---|
| 2005/0174470 A1* | 8/2005 | Yamasaki | G02B 27/017 348/345 |
| 2005/0195277 A1* | 9/2005 | Yamasaki | 348/61 |
| 2008/0042999 A1* | 2/2008 | Martin | G03B 21/132 345/178 |
| 2010/0328439 A1* | 12/2010 | Mihara | G09G 3/003 348/53 |
| 2011/0075257 A1* | 3/2011 | Hua et al. | 359/464 |
| 2011/0234879 A1 | 9/2011 | Kashitani | |
| 2011/0316763 A1* | 12/2011 | Yada | 345/8 |
| 2012/0127284 A1* | 5/2012 | Bar-Zeev et al. | 348/53 |
| 2013/0050432 A1* | 2/2013 | Perez et al. | 348/47 |
| 2013/0147711 A1* | 6/2013 | Njolstad et al. | 345/158 |

* cited by examiner

HEAD-MOUNTED DISPLAY DEVICE AND CONTROL METHOD FOR THE HEAD-MOUNTED DISPLAY DEVICE

BACKGROUND

1. Technical Field

The present invention relates to a head-mounted display device and a control method for the head-mounted display device.

2. Related Art

There is known a technique called augmented reality (AR) for adding information to a real environment and presenting the information using a computer. The augmented reality is installed in a smartphone, a head mounted display (hereinafter referred to as "head-mounted display device"), and the like. FIGS. 1A and 1B are explanatory diagrams for explaining the augmented reality. FIG. 1A shows a state in which the augmented reality is realized by a non-transmissive head-mounted display device. The head-mounted display device picks up an image of an outside scene using a camera, recognizes an image CP obtained by the image pickup, and generates information to be added and presented (in an example shown in the figure, objects OB). The head-mounted display device causes a liquid crystal screen to display an image obtained by superimposing the picked-up image CP and the generated objects OB. Consequently, a user of the head-mounted display device can experience the augmented reality. In the example explained herein, the augmented reality is realized using the non-transmissive head-mounted display device. However, the augmented reality can be realized by the smartphone and the like. For example, JP-A-2011-203823 discloses a non-transmissive head-mounted display device implemented with the technique of the augmented reality.

As another document disclosing the related art, there is JP-2010-146481.

FIG. 1B shows a state in which the augmented reality is realized by an optically transmissive head-mounted display device. Like the non-transmissive head-mounted display device, the optically transmissive head-mounted display device recognizes the image CP obtained by image pickup and generates information to be added and presented (the objects OB). Thereafter, the optically transmissive head-mounted display device causes a liquid crystal screen to display only the generated objects OB. A user visually recognizes both of the objects OB displayed on the liquid crystal screen and displayed as a virtual image VI and an outside scene SC seen through a lens in front of the user. Consequently, the user can experience the augmented reality. A region obtained by the image pickup shown in a first drawing from the left in FIG. 1B is referred to as "image pickup visual field" as well. A region displayed as the virtual image VI shown in a second drawing from the left in FIG. 1B is referred to as "video visual field" as well. A region recognizable as the outside scene SC shown in a third diagram from the left in FIG. 1B is referred to as "real visual field" as well.

In some cases, the size of a region where the virtual image VI is projected before the eyes of the user (a portion where the real visual field and the video visual field overlap) and the size of a region where image pickup can be performed by a camera (the image pickup visual field) do not coincide with each other. When the sizes of the regions do not coincide with each other, in the optically transmissive head-mounted display device, a shift occurs between the objects OB displayed as the virtual image VI and the outside scene SC seen through the lens before the eyes and gives a sense of discomfort to the user. Specifically, for example, when the region where image pickup can be performed by the camera (the video visual field) is broad, in the optically transmissive head-mounted display device in the past, the objects OB corresponding to the broad range are generated and displayed before the eyes of the user as the virtual image VI. In such a case, the user feels a sense or discomfort because of inconsistency that occurs between the outside scene SC in the region where the virtual image VI is projected before the eyes of the user (the portion where the real visual field and the video visual field overlap) and the objects OB.

SUMMARY

An advantage of some aspects of the invention is to reduce a sense of discomfort that occurs when the augmented reality is realized in the optically transmissive head-mounted display device.

The invention can be implemented as the following forms or application examples.

Application Example 1

This application example is directed to a head-mounted display device with which a user can visually recognize a virtual image and an outside scene simultaneously. The head-mounted display device includes: an image pickup unit configured to pick up an image of the outside scene and acquire an outside scene image; an augmented-reality processing unit configured to analyze the acquired outside scene image and generate additional image data for augmented reality according to a result of the analysis; a display element configured to generate image light using the generated additional image data; and a light guide unit configured to form a virtual image before the eyes of the user using the generated image light. The augmented-reality processing unit acquires an overlapping region where a display region for the virtual image and an image pickup region of the image pickup unit overlap in the outside scene image and generates the additional image data using the overlapping region.

With such a configuration, the augmented-reality processing unit acquires the overlapping region where the display region for the virtual image and the image pickup region of the image pickup unit overlap and generates the additional image data using the overlapping region. Therefore, it is possible to reduce a sense of discomfort that occurs when the augmented-reality processing unit realizes the augmented reality.

Application Example 2

This application example is directed to the head-mounted display device described in Application Example 1, which further includes a storing unit having stored therein guide image data for showing the display region for the virtual image to the user, wherein the augmented-reality processing unit causes the display element to generate image light using the guide image data, guide the user to show a predetermined indicator in the display region for the virtual image, causes the image pickup unit to acquire the outside scene image, and acquires, as a boundary between the overlapping region and other regions, a position of the indicator obtained by analyzing the acquired outside scene image.

With such a configuration, the augmented-reality processing unit causes the display element to generate image light using the guide image data, guides the user to show the predetermined indicator in the display region for the virtual image, causes the image pickup unit to acquire the outside scene image, and acquires, as the boundary between the overlapping region and the other regions, the position of the indicator obtained by analyzing the acquired outside scene image. As a result, the augmented-reality processing unit can acquire the overlapping region where the display region for the virtual image and the image pickup region of the image pickup unit overlap.

Application Example 3

This application example is directed to the head-mounted display device described in Application Example 2, wherein the guide image data has a rectangular shape having an aspect ratio same as an aspect ratio of the display element and include guide marks arranged in at least two places among four corners of the rectangular shape, and the augmented-reality processing unit guides the user to show the indicator by pointing at the guide mark with a finger.

With such a configuration, the augmented-reality processing unit guides the user to show the indicator by pointing at the guide mark with the finger. Therefore, it is possible to give the predetermined indicator to the display region for the virtual image without requiring a special device and with simple operation easily understood by the user.

Application Example 4

This application example is directed to the head-mounted display device described in Application Example 2, wherein the guide image data has a rectangular shape having an aspect ratio same as an aspect ratio of the display element and includes frame-like guide marks arranged in at least two places among four corners of the rectangular shape, and the augmented-realty processing unit guides the user to show the indicator by arranging an object having rectangular sides to be fit in the frame of the guide marks.

With such a configuration, the augmented-realty processing unit guides the user to show the indicator by arranging the object having the rectangular sides to be fit in the frame of the guide marks. Therefore, it is possible to give the indicator to the display region for the virtual image with single operation.

Application Example 5

This application example is directed to the head-mounted display device described in anyone of Application Examples 1 to 4, which further includes: a second image pickup unit arranged in a position corresponding to the right eye or temple of the user or the periphery of the eye or the temple during wearing of the head-mounted display device and configured to pick up an image of the outside scene and acquire a second outside scene image; and a third image pickup unit arranged in a position corresponding to the left eye or temple of the user or the periphery of the eye or the temple during wearing of the head-mounted display device and configured to pick up an image of the outside scene and acquire a third outside scene image, wherein the augmented-reality processing unit further calculates a shift amount between a specific object included in the second outside scene image and the specific object included in the third outside scene image and acquires information concerning the depth of the object in an external environment from the calculated shift amount.

With such a configuration, the augmented-realizing processing unit can further calculate a shift amount between the specific object included in the second outside scene image picked up by the second image pickup unit arranged in the position corresponding to the right eye or temple of the user or the periphery of the eye or the temple during wearing of the head-mounted display device and the specific object included in the third outside scene image picked up by the third image pickup unit arranged in the position corresponding to the left eye or temple of the user or the periphery of the eye or the temple during wearing of the head-mounted display device and acquire the information concerning the depth of the object in the external environment from the calculated shift amount.

The invention can be realized in various formed. For example, the invention can be realized in forms of a head-mounted display device and a control method for the head-mounted display device, an image display system, a computer program for realizing functions of the method, the device, or the system, a recording medium having recorded therein the computer program, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
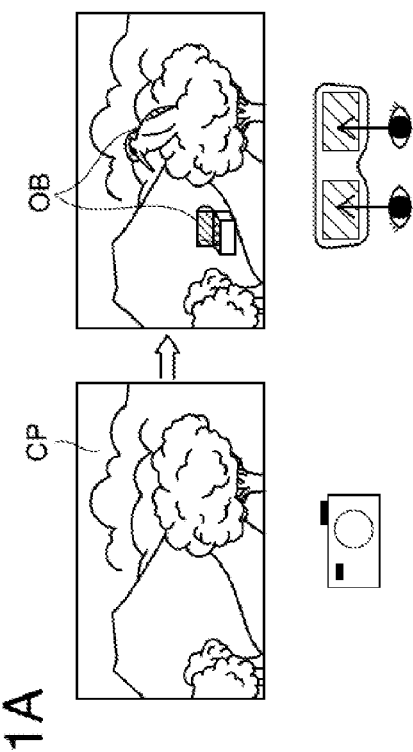
FIGS. 1A and 1B are explanatory diagrams for explaining augmented reality.
Figure 1B:
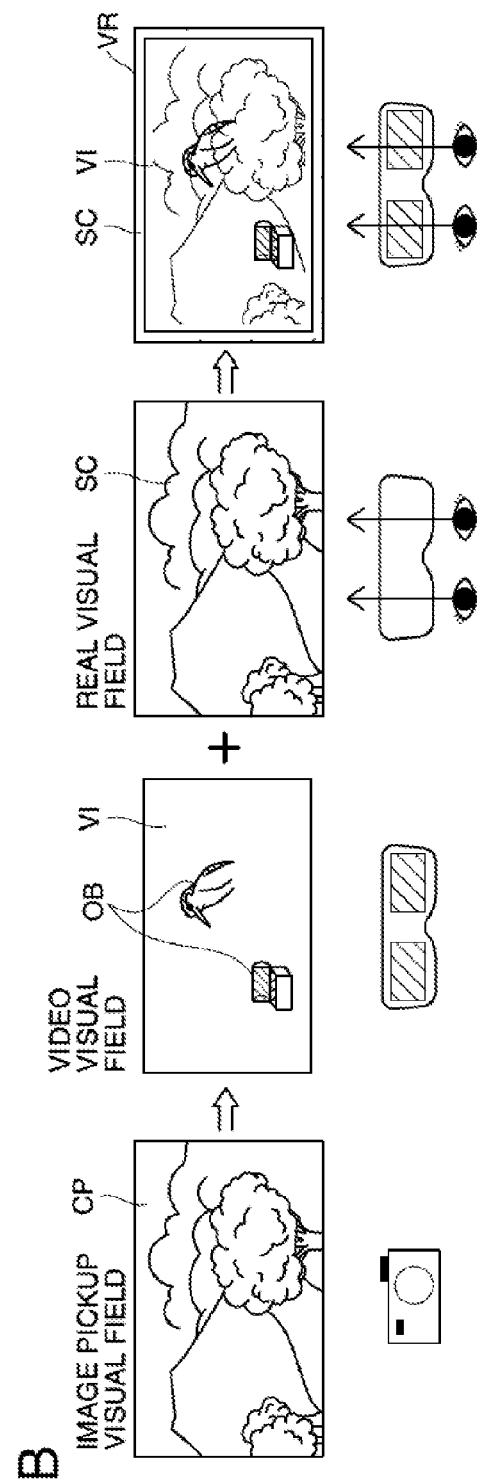
Figure 2:
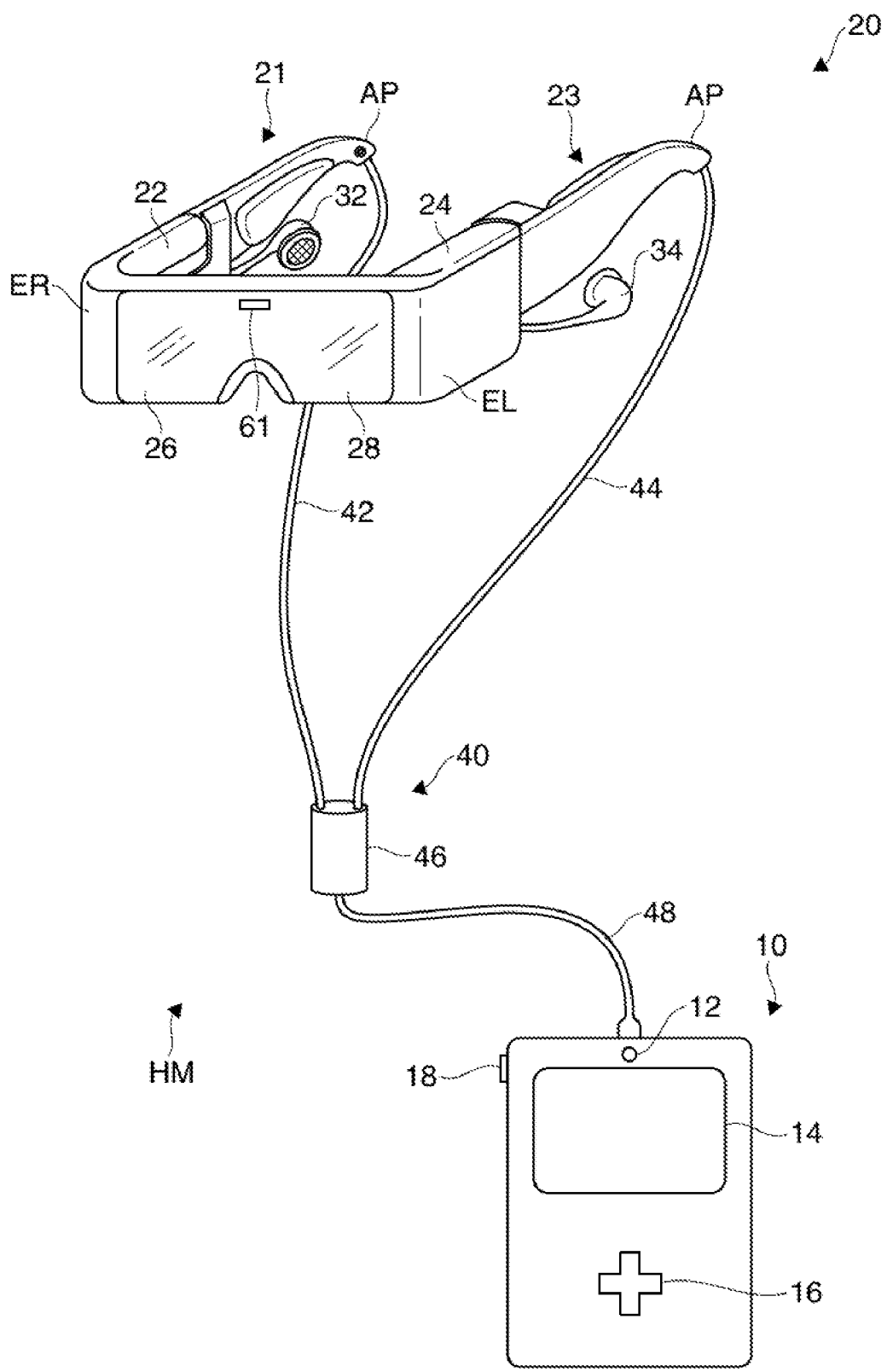
FIG. 2 is an explanatory diagram showing the configuration of the external appearance of a head-mounted display device in a first embodiment of the invention.

Embodiments of the invention are explained below on the basis of examples.
A. First Embodiment
A-1. Configuration of a Head-Mounted Display Device
FIG. 2 is an explanatory diagram showing the configuration of the external appearance of a head-mounted display device in a first embodiment of the invention. A head-mounted display device HM is a head-mounted display device worn on the head and is referred to as head mounted display (HMD) as well. The head mounted display HM in this embodiment is an optically transmissive head-mounted display device with which a user can visually recognize a virtual image and at the same time can directly visually recognize an outside scene.

The head mounted display HM includes an image display unit 20 that causes the user to visually recognize a virtual image in a state in which the head mounted display HM is worn on the head of the user and a control unit (a controller) 10 that controls the image display unit 20.

The image display unit 20 is a wearing body worn on the head of the user. In this embodiment, the image display unit 20 has an eyeglass shape. The image display unit 20 includes a right holding unit 21, a right display driving unit 22, a left holding unit 23, a left display driving unit 24, a right optical-image display unit 26, a left optical-image display unit 28, and a camera 61. The right optical-image display unit 26 and the left optical-image display unit 28 are arranged in positions corresponding to positions before the right and left eyes of the user during wearing of the head mounted display HM. One end of the right optical-image display unit 26 and one end of the left optical-image display unit 28 are connected to each other in a position corresponding to the middle of eyebrows of the user during wearing of the head mounted display HM. The right holding unit 21 extends from an end portion ER, which is the other end of the right optical-image display unit 26. The left holding unit 23 extends from an end portion EL, which is the other end of the left optical-image display unit 28.

The right holding unit 21 is a member provided to extend from the end portion ER of the right optical-image display unit 26 to a position corresponding to the side head portion of the user during wearing of the head mounted display HM to form a substantially right angle with the right optical-image display unit 26. Similarly, the left holding unit 23 is a member provided to extend from the end portion EL of the left optical-image display unit 28 to a position corresponding to the side head portion of the user during wearing of the head mounted display HM to form a substantially right angle with the left optical-image display unit 28. Like temples of eyeglasses, the right holding unit 21 and the left holding unit 23 hold the head mounted display HM on the head of the user.

The right display driving unit 22 is arranged on the inner side of the right holding unit 21, in other words, a side opposed to the head of the user during wearing of the head mounted display HM and the end portion ER side of the right optical-image display unit 26. The left display driving unit 24 is arranged on the inner side of the left holding unit 23 and on the end portion EL side of the left optical-image display unit 28. In the following explanation, the right holding unit 21 and the left holding unit 23 are collectively simply referred to as "holding unit" as well. The right display driving unit 22 and the left display driving unit 24 are collectively simply referred to as "display driving unit" as well. The right optical-image display unit 26 and the left optical-image display unit 28 are collectively simply referred to as "optical-image display unit" as well.

The display driving unit includes an LCD (Liquid Crystal Display), a projection optical system, and the like, which are not shown in the figure. Details of the display driving unit are explained below. The optical-image display unit functioning as an optical member includes a light guide plate and a dimming plate, which are not shown in the figure. The light guide plate is formed of an optically transparent resin material or the like. The light guide plate emits image light, which is captured from the display driving unit, to the eyes of the user. The dimming plate is an optical element having a thin plate shape. The dimming plate is arranged to cover the front side (a side opposite to the side of the eyes of the user) of the head mounted display HM. The dimming plate can protect the light guide plate, suppress damage to the light guide plate, adhesion of stains, and the like, and adjust an amount of external light entering the eyes of the user and adjust easiness of visual recognition of a virtual image by adjusting light transmittance of the dimming plate. The dimming plate does not have to be provided.

The camera 61 is arranged in a position corresponding to the middle of eyebrows of the user during wearing of the head mounted display HM. The camera 61 picks up an image of an outside scene (a scene on the outside) in a front side direction of the head mounted display HM, in other words, a direction on the opposite side of the side of the eyes of the user and acquires an outside scene image. In this embodiment, the camera 61 is equivalent to the "image pickup unit". The camera 61 in this embodiment is illustrated as a monocular camera. However, a stereo camera may be adopted.

The image display unit 20 further includes a connecting unit 40 for connecting the image display unit 20 to the control unit 10. The connecting unit 40 includes a main body cord 48 connected to the control unit 10, two right and left cords 42 and 44 branching from the main body cord 48, and a coupling member 46 provided in a branching point. The right cord 42 is inserted into a housing of the right holding unit 21 from a distal end portion AP in the extending direction of the right holding unit 21 and connected to the right display driving unit 22. Similarly, the left cord 44 is inserted into a housing of the left holding unit 23 from a distal end portion AP in the extending direction of the left holding unit 23 and connected to the left display driving unit 24.

The image display unit 20 and the control unit 10 perform transmission of various signals via the connecting unit 40. Connectors (not shown in the figure) fitting with each other are respectively provided in an end portion of the main body cord 48 on the opposite side of the coupling member 46 and the control unit 10. The control unit 10 and the image display unit 20 are connected and disconnected by fitting and release of the fitting of the connector of the main body cord 48 and the connector of the control unit 10. As the right cord 42, the left cord 44, and the main body cord 48, for example, a metal cable or an optical fiber can be adopted.

The control unit 10 is a device for operating the head mounted display HM. The control unit 10 includes a lighting unit 12, a touch pad 14, a cross key 16, and a power switch 18. The lighting unit 12 notifies, with a light-emitting state thereof, an operation state of the head mounted display HM (e.g., ON/OFF of a power supply). As the lighting unit 12, for example, an LED (Light Emitting Diode) can be used. The touch pad 14 detects operation of a finger of the user on an operation surface of the touch pad 14 and outputs a signal corresponding to detected content. The cross key 16 detects depressing operation for keys corresponding to the up down and left right directions and outputs a signal corresponding to detected content. The power switch 18 detects slide operation of a switch to switch a power input state of the head mounted display HM.

Figure 3:
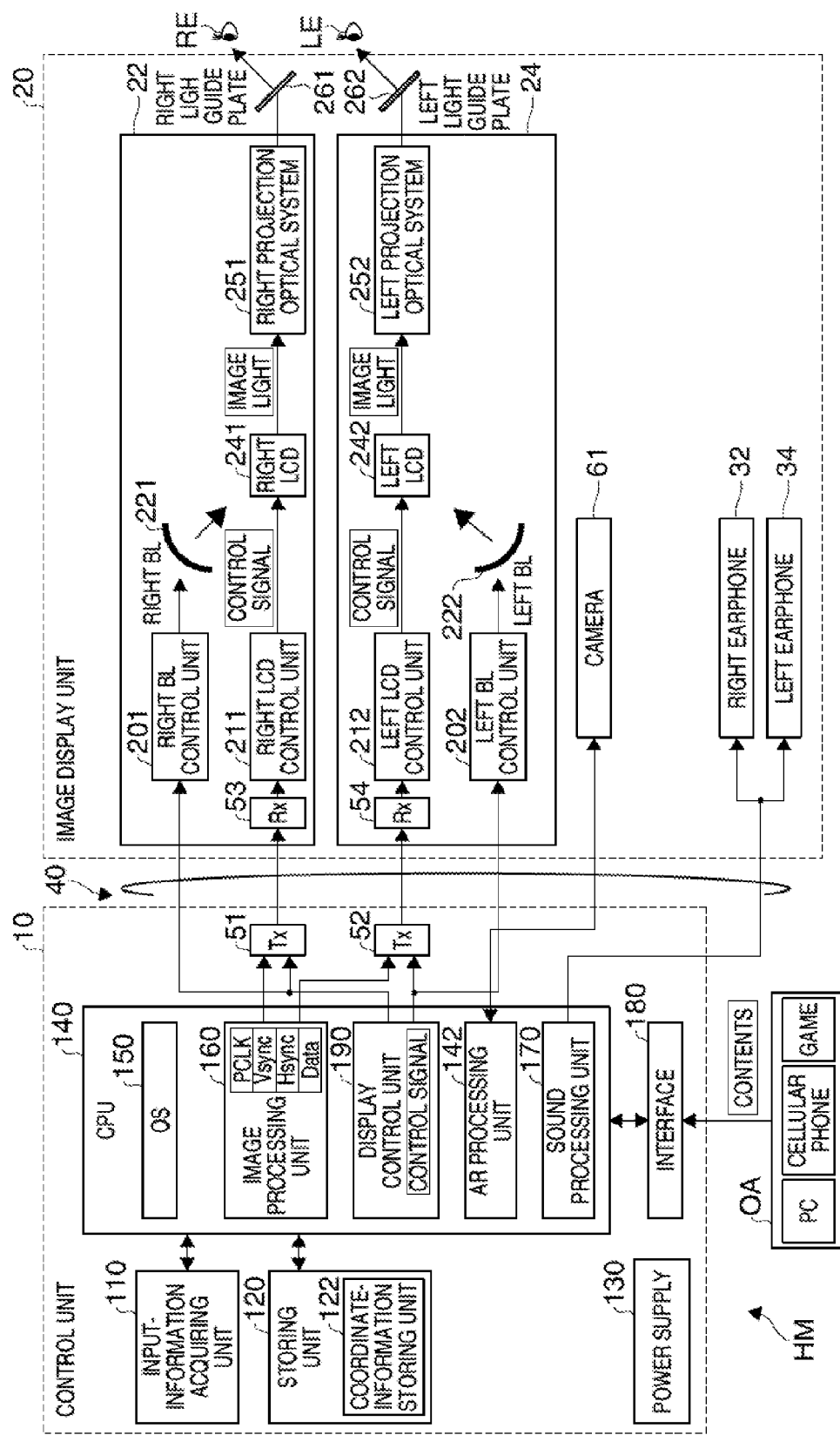
FIG. 3 is a block diagram functionally showing the configuration of a head mounted display.

FIG. 3 is a block diagram functionally showing the configuration of the head mounted display HM. The control unit 10 includes an input-information acquiring unit 110, a storing unit 120, a power supply 130, a CPU 140, an interface 180, and transmitting units (Tx) 51 and 52. The units are connected to one another by a not-shown bus.

The input-information acquiring unit 110 has a function of acquiring a signal corresponding to an operation input by the user such as an operation input to the touch pad 14, the cross key 16, or the power switch 18. The storing unit 120 is a storing unit including a ROM, a RAM, a DRAM, or a hard disk, which are not shown in the figure. Further, the storing unit 120 includes a coordinate-information storing unit 122. The coordinate-information storing unit 122 is a storage region for storing a coordinate calculated in region determination processing executed by an AR processing unit 142. The power supply 130 supplies electric power to the units of the head mounted display HM. As the power supply 130, for example, a secondary battery can be used.

The CPU 140 executes a computer program installed in advance to thereby provide a function of an operating system (OS) 150. The CPU 140 expands firmware or a computer program, which is stored in the ROM or the hard disk, on the RAM and executes the firmware or the computer program to thereby function as the AR processing unit 142, an image processing unit 160, a sound processing unit 170, and a display control unit 190 as well.

The AR processing unit 142 is triggered by a processing start request from the OS 150 or a specific game application to execute processing for realizing the augmented reality (hereinafter referred to as "AR processing" as well). In the AR processing, the AR processing unit 142 analyzes an outside scene image acquired by the camera 61 and generates additional image data for the augmented reality according to a result of the analysis. Since an analysis method for the outside scene image and a generation method for the additional image data are well known, explanation of the methods is omitted. The AR processing unit 142 executes the region determination processing prior to the AR processing. The region determination processing is processing for determining an analysis range in "analyzing the outside scene image" in the AR processing. Details of the region determination processing are explained below. The AR processing unit 142 is referred to as "augmented reality processing unit" as well.

The image processing unit 160 generates a clock signal PCLK, a vertical synchronization signal VSync, a horizontal synchronization signal HSync, and image data Data on the basis of the additional image data generated in the AR processing and contents or the like input via the interface 180 and supplies the signals to the image display unit 20 via the connecting unit 40.

When performing the supply based on designated additional image data, the image processing unit 160 acquires display setting (VSync, HSync, etc.) decided in advance as a default value and stored in the storing unit 120. The image processing unit 160 generates, according to the acquired display setting, the clock signal PCLK using a not-shown PLL (Phase Locked Loop) circuit or the like. Thereafter, the image processing unit 160 stores the additional image data Data (RGB data) in the DRAM in the storing unit 120.

On the other hand, when performing supply based on contents, the image processing unit 160 acquires an image signal included in the contents. For example, in the case of a moving image, in general, the acquired image signal is an analog signal formed by thirty frame images per one second. The image processing unit 160 separates, from the acquired image signal, synchronization signals such as the vertical synchronization signal VSync and the horizontal synchronization signal HSync. The image processing unit 160 generates the clock signal PCLK using a not-shown PLL circuit or the like according to a period of the vertical synchronization signal VSync and the horizontal synchronization signal HSync separated from the image signal. The image processing unit 160 converts the analog image signal, from which the synchronization signals are separated, into a digital image signal using a not-shown A/D conversion circuit or the like. Thereafter, the image processing unit 160 stores the converted digital image signal in the DRAM in the storing unit 120 frame by frame as target image data Data (RGB data).

When the additional image data and the contents are given in a digital format, since the clock signal PCLK is output in synchronization with the image signal, the vertical synchronization signal VSync and the horizontal synchronization signal HSync and A/D conversion of the analog image signal are unnecessary. In the following explanation, the additional image data Data and the target image data Data are collectively referred to as "image data Data" as well. The image processing unit 160 may executes, according to necessity, image processing such as resolution conversion processing, tone correction processing including adjustment of luminance and chroma, and keystone correction processing on the image data Data stored in the storing unit 120.

The image processing unit 160 transmits the clock signal PCLK, the vertical synchronization signal VSync, and the horizontal synchronization signal HSync generated as explained above and the image data Data stored in the DRAM in the storing unit 120 respectively via the transmitting units 51 and 52. The image data Data transmitted via the transmitting unit 51 is referred to as "image data for right eye Data1" as well and the image data Data transmitted via the transmitting unit 52 is referred to as "image data for left eye Data2" as well. The transmitting units 51 and 52 function as a transceiver for serial transmission between the control unit 10 and the image display unit 20.

The display control unit 190 generates control signals for controlling the right display driving unit 22 and the left display driving unit 24. Specifically, the display control unit 190 individually controls, according to the control signals, ON/OFF of driving of a right LCD 241 by a right LCD control unit 211, ON/OFF of driving of a right backlight 221 by a right backlight control unit 201, ON/OFF of driving of a left LCD 242 by a left LCD control unit 212, ON/OFF of driving of a left backlight 222 by a left backlight control unit 202, and the like to thereby control generation and emission of image light by each of the right display driving unit 22 and the left display driving unit 24. For example, the display control unit 190 causes both of the right display driving unit 22 and the left display driving unit 24 to generate image light, causes only one of the display driving units to generate image light, or does not cause both the display driving units to generate image light.

The display control unit 190 transmits the control signals for the right LCD control unit 211 and the left LCD control unit 212 respectively via the transmitting units 51 and 52. The display control unit 190 transmits the control signals for the right backlight control unit 201 and the left backlight control unit 202 respectively via the transmitting units 51 and 52.

The sound processing unit 170 acquires a sound signal included in the contents, amplifies the acquired sound signal, and supplies the sound signal to a not-shown speaker in a right earphone 32 and a not-shown speaker in a left earphone 34 of the image display unit 20 via the connecting unit 40. For example, when a Dolby (registered trademark) system is adopted, processing for the sound signal is performed and different sounds having, for example, varied frequencies or the like are respectively output from the right earphone 32 and the left earphone 34.

The interface 180 is an interface for connecting various external apparatuses OA, which are supply sources of contents, to the control unit 10. As the external apparatuses OA, there are, for example, a personal computer PC, a cellular phone terminal, and a game terminal. As the interface 180, for example, a USB interface, a micro USB interface, a memory card interface, and a wireless LAN interface can be provided.

The image display unit 20 includes the right display driving unit 22, the left display driving unit 24, a right light guide plate 261 functioning as the right optical-image display unit 26, a left light guide plate 262 functioning as the left optical-image display unit 28, the camera 61, the right earphone 32, and the left earphone 34.

The right display driving unit 22 includes a receiving unit (Rx) 53, the right backlight (BL) control unit 201 and the right backlight (BL) 221 functioning as a light source, a right LCD control unit 211 and the right LCD 241 functioning as a display element, and a right projection optical system 251. The right backlight control unit 201, the right LCD control unit 211, the right backlight 221, and the right LCD 241 are collectively referred to as "image-light generating unit" as well.

The receiving unit 53 functions as a receiver for serial transmission between the control unit 10 and the image display unit 20. The right backlight control unit 201 has a function of driving the right backlight 221 on the basis of an input control signal. The right backlight 221 is a light-emitting body such as an LED or an electroluminescence (EL). The right LCD control unit 211 has a function of driving the right LCD 241 on the basis of the clock signal PCLK, the vertical synchronization signal VSync, the horizontal synchronization signal HSync, and the image data for right eye Data1 input via the receiving unit 53. The right LCD 241 is a transmissive liquid crystal panel on which a plurality of elements are arranged in a matrix shape.

Figure 4:
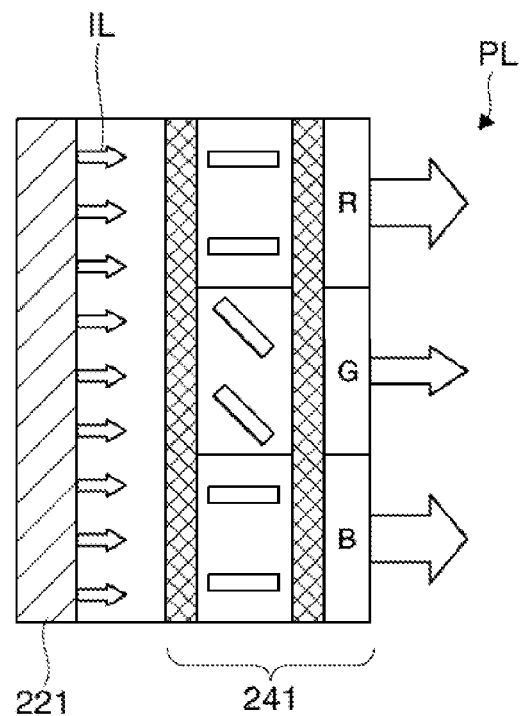
FIG. 4 is an explanatory diagram showing a state in which image light is emitted by an image-light generating unit.

FIG. 4 is an explanatory diagram showing a state in which image light is emitted by the image-light generating unit. The right LCD 241 has a function of, by driving liquid crystal corresponding to the positions of the pixels arranged in a matrix shape, changing the transmittance of light transmitted through the right LCD 241 to thereby modulate illumination light IL radiated from the right backlight 221 into effective image light PL representing an image. As shown in FIG. 4, a backlight system is adopted in this embodiment. However, image light may be emitted using a front light system or a reflection system.

The right projection optical system 251 shown in FIG. 3 is configured by a collimate lens that changes image light emitted from the right LCD 241 into light beams in a parallel state. The right light guide plate 261 functioning as the right optical-image display unit 26 guides the image light output from the right projection optical system 251 to the right eye RE of the user while reflecting the image light along a predetermined optical path. The right projection optical system 251 and the right light guide plate 261 are collectively referred to as "light guide unit" as well. As the light guide unit, an arbitrary system can be used as long as a virtual image is formed before the eyes of the user using the image light. For example, a diffraction grating may be used or a semitransparent reflection film may be used.

The left display driving unit 24 includes a receiving unit (Rx) 54, the left backlight (BL) control unit 202 and the left backlight (BL) 222 functioning as a light source, the left LCD control unit 212 and the left LCD 242 functioning as a display element, and a left projection optical system 252. The left backlight control unit 202, the left LCD control unit 212, the left backlight 222, and the left LCD 242 are collectively referred to as "image-light generating unit" as well. The left projection optical system 252 and the left light guide plate 262 are collectively referred to as "light guide unit" as well. The right display driving unit 22 and the left display driving unit 24 are provided as a pair. Since the units of the left display driving unit 24 have configurations and operations same as the configurations and the operations of the units of the right display driving unit 22 explained above, detailed explanation of the units of the left display driving unit 24 is omitted.

Figure 5:
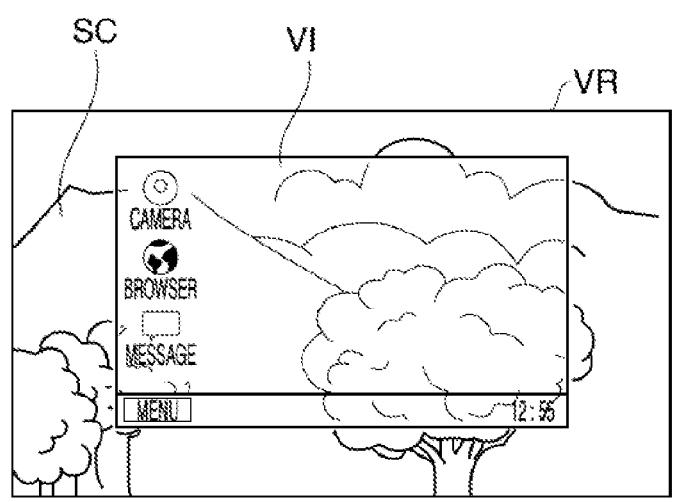
FIG. 5 is an explanatory diagram showing an example of a virtual image recognized by a user.

FIG. 5 is an explanatory diagram showing an example of a virtual image recognized by the user. The image light guided to both the eyes of the user of the head mounted display HM as explained above is focused on the retinas of the user, whereby the user can visually recognize a virtual image. As shown in FIG. 5, a virtual image VI is displayed in a visual field VR of the user of the head mounted display HM. In a portion where the virtual image VI is displayed in the visual field VR of the user, the user can see the outside scene SC via the virtual image VI in the optical-image display unit. Further, in a portion other than the portion where the virtual image VI is displayed in the visual field VR of the user, the user can directly see the outside scene SC through the optical-image display unit.

A region where the virtual image VI is displayed is referred to as "video visual field" as well. A region where the user can visually recognize the outside scene SC, in other words, a region in the visual field VR is referred to as "real visual field" as well. A region where the virtual image VI is projected before the eyes of the user can be considered a portion where the real visual field and the video visual field overlap.

A-2. Region Determination Processing

Figure 6:
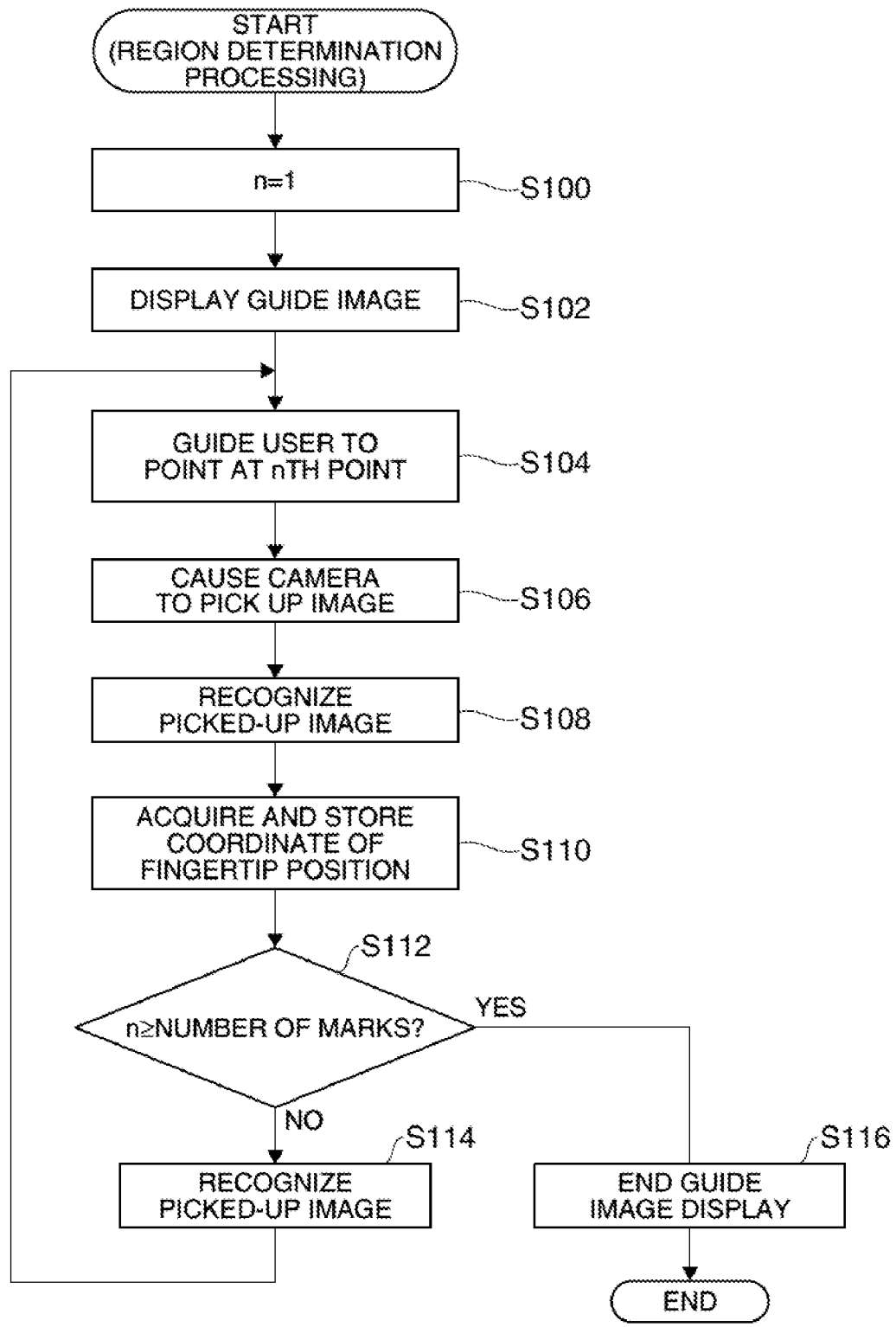
FIG. 6 is a flowchart for explaining a procedure of region determination processing.
Figure 7A:
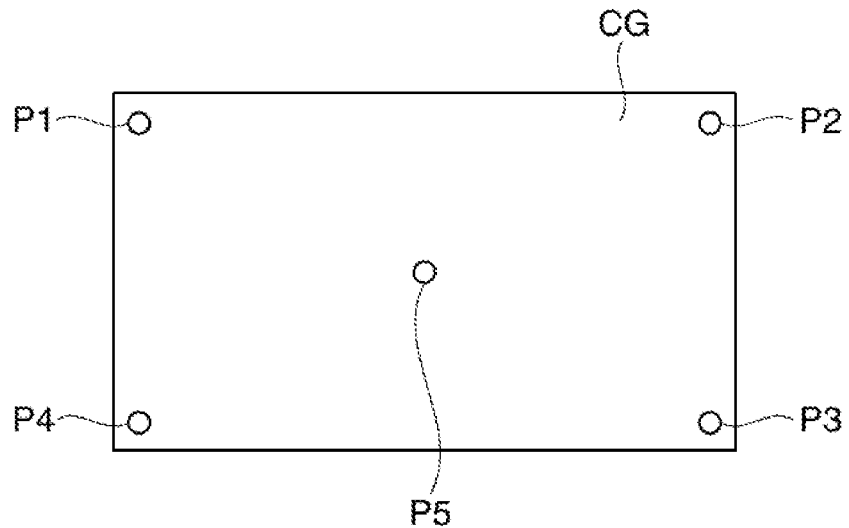
FIGS. 7A and 7B are explanatory diagrams for explaining the region determination processing.
Figure 7B:
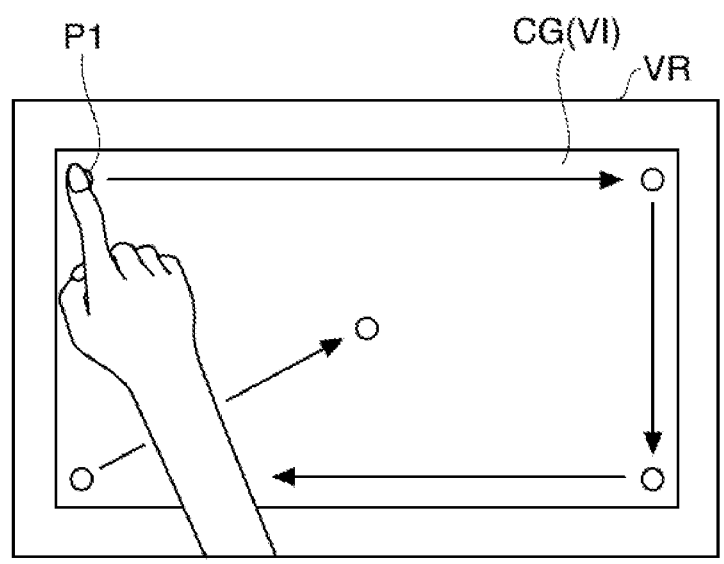

FIG. 6 is a flowchart for explaining a procedure of region determination processing. FIGS. 7A and 7B are explanatory diagrams for explaining the region determination processing. The region determination processing is processing executed by the AR processing unit 142 prior to the AR processing and is processing for determining an analysis range in "analyzing an outside scene image" in the AR processing. The region determination processing may operate as a sub-routine of the AR processing.

First, the AR processing unit 142 sets "1" in a variable n used in the region determination processing to thereby perform initialization of the variable (step S100). Subsequently, the AR processing unit 142 causes the image display unit 20 to display a guide image as a virtual image (step S102). FIG. 7A is an explanatory diagram showing an example of a guide image CG. The guide image CG is an image for showing an end portion of a display region for the virtual image to the user of the head mounted display HM. The guide image CG in this embodiment is an image that has a rectangular shape having an aspect ratio same as an aspect ratio of the right LCD 241 and the left LCD 242 (display elements) and has a background of single color of white. The guide image CG has circular guide marks P1 to P5 at the four corners and in a portion located at the intersection of the diagonal lines. Image data of the guide image CG (hereinafter referred to as "guide image data" as well) is stored in the storing unit 120 in advance.

In step S102, the AR processing unit 142 reads out guide image data stored in the storing unit 120 and transmits the guide image data to the image processing unit 160. The image processing unit 160 that receives the guide image data executes the processing explained with reference to FIG. 3. As a result, the guide image CG shown in FIG. 7A is displayed as the virtual image VI in the visual field VR of the user of the head mounted display HM.

In step S104, the AR processing unit 142 guides the user to point at an nth guide mark in the guide image CG displayed as the virtual image VI. An "nth point" fluctuates according to a value of the variable n initialized in step S100. As a method of guiding the user, the AR processing unit 142 may display a message displayed using a dialog box or the like or may perform guidance by sound. The guidance by sound is desirable in that the guidance can be performed without interrupting the guide image CG being displayed.

Figure 8:
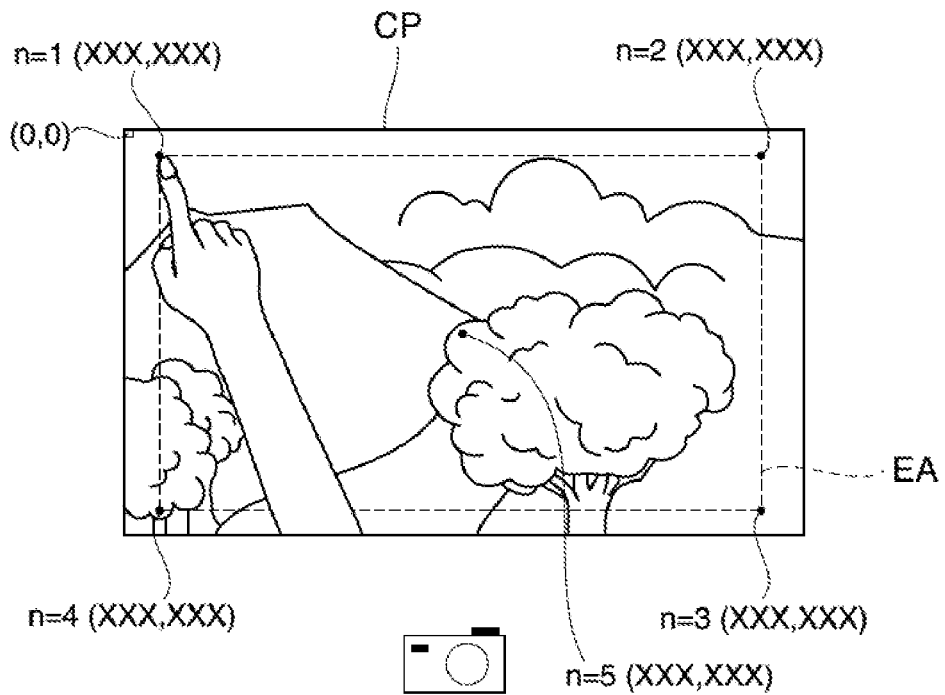
FIG. 8 is an explanatory diagram showing an example of an outside scene image picked up by a camera.

FIG. 7B shows a state in which the user points at a first guide mark P1 of the guide image CG displayed as the virtual image VI in the visual field VR of the user. In FIG. 7B, for convenience of illustration, the outside scene SC transmitted through the optical-image display unit is not shown. After guiding the user, in step S106 in FIG. 6, the AR processing unit 142 causes the camera 61 to pick up an outside scene image. FIG. 8 is an explanatory diagram showing an example of the outside scene image CP picked up by the camera 61.

In step S108, the AR processing unit 142 recognizes the picked-up outside scene image CP and specifies the position of a fingertip of the person. The AR processing unit 142 acquires a coordinate of the fingertip position and stores the coordinate in the coordinate-information storing unit 122 (step S110). Specifically, the AR processing unit 142 acquires the coordinate of the position of the fingertip specified in step S108. The coordinate can be defined as, for example, amounts of movement in the X direction and the Y direction from a coordinate (0, 0) of a pixel in an uppermost left portion of the outside scene image CP. The AR processing unit 142 stores the acquired coordinate and a value of the variable n in the coordinate-information storing unit 122 in association with each other.

The AR processing unit 142 determines whether the value of the variable n is equal to or larger than the number of guide marks arranged on the guide image CG (step S112). When the value of the variable n is smaller than the number of guide marks (NO in step S112), the AR processing unit 142 increments the variable n and shifts the processing to step S104. The AR processing unit 142 repeats, for the next guide mark, the series of processing including the acquisition of the outside scene image CP, the acquisition of a coordinate of a fingertip position, and the storage of the coordinate. On the other hand, when the value of the variable n is equal to or larger than the number of guide marks (YES in step S112), the AR processing unit 142 transmits a request for ending the display of the guide image to the image processing unit 160 and the display control unit 190 (step S116) and ends the processing.

In this way, the AR processing unit 142 causes the image display unit 20 to display the virtual image VI of the guide image in the visual field of the user in a state which the guide image is displayed fully in displayable regions of the right LCD 241 and the left LCD 242 (the display elements). The AR processing unit 142 acquires a coordinate that indicates to which positions of the outside scene image CP picked up by the camera 61 guide marks P1 to P4 present at the four corners of the guide image correspond. In other words, in the region determination processing, the AR processing unit 142 acquires, in advance, a region where an image pickup region of the camera 61 (the image pickup unit) and a display region for the virtual image VI overlap, i.e., a region EA shown in FIG. 8. The region where the image pickup region of the camera 61 and the display region for the virtual image VI overlap is referred to as "overlapping region" as well.

As explained above, according to the first embodiment, the AR processing unit 142 (the augmented reality processing unit) acquires the overlapping region EA prior to the AR processing. In the following AR processing, the AR processing unit 142 generates additional image data for the augmented reality using the acquired overlapping region EA, specifically, by setting, as an analysis target, an image in the overlapping region EA in the outside scene image CP picked up by the camera 61. Consequently, it is possible to simulatively match (calibrate) the size of the region where image pickup can be performed by the camera 61 (the video visual field) and the size of the region projected as the virtual image VI before the eyes of the user (the portion where the real visual field and the video visual field overlap). As a result, it is possible to suppress a shift from occurring between information for additional presentation (the objects OB) displayed in the AR processing and the outside scene SC that the user sees through the optical-image display unit before the eyes of the user. In the optically transmissive head mounted display HM (head-mounted display device), it is possible to reduce a sense of discomfort that occurs when the AR processing unit 142 realizes the augmented reality.

In the embodiment, a method of "limiting an analysis target" is explained as a method of using the overlapping region EA when the AR processing unit 142 generates additional image data. However, the method is only an example. Various methods of using the overlapping region EA are possible. For example, the AR processing unit 142 may analyze all outside scene images CP picked up by the camera 61 and generate additional image data obtained by changing a display method for information for additional presentation in the overlapping region EA and information for additional presentation outside the overlapping region EA. Specifically, the information for additional presentation in the overlapping region EA can be displayed in a form for enabling recognition of content and the information for additional presentation outside the overlapping region EA can be displayed in a form indicating only presence using an icon such as an arrow.

The AR processing unit 142 (the augmented-reality processing unit) causes the LCDs 241 and 242 to generate image light using the guide image data and, after guiding the user to show a predetermined indicator in the display region for the virtual image VI, causes the camera 61 to acquire the outside scene image CP, and acquires, as a boundary between the overlapping region EA and the other regions, a position of the indicator obtained by analyzing the acquired outside scene image CP. As a result, the AR processing unit 142 can acquire the overlapping region EA where the display region for the virtual image VI and the image pickup region of the camera 61 overlap.

Further, the AR processing unit 142 (the augmented-reality processing unit) guides the user to show the indicator by pointing at the guide marks P1 to P5 with the finger. Therefore, it is possible to give the predetermined indicator to the display region for the virtual image VI without requiring a special device and with simple operation easily understood by the user.

B. Second Embodiment

In a second embodiment of the invention, a configuration in which an acquisition method for an overlapping region in region determination processing is different is explained. In the following explanation, only components having configurations and operations different from the configurations and the operations in the first embodiment are explained. In the figures, components same as the components in the first embodiment are denoted by reference numerals and signs same as the reference numerals and signs in the first embodiment explained above. Detailed explanation of the components is omitted.

B-1. Configuration of a Head-Mounted Display Device

The configuration of a head mounted display HMa in the second embodiment is substantially the same as the configuration in the first embodiment explained with reference to FIGS. 1A to 5.

However, the head mounted display HMa in the second embodiment is different from the head mounted display HM in the first embodiment in that the head mounted display HMa includes an AR processing unit 142a instead of the AR processing unit 142. Further, the head mounted display HMa in the second embodiment is different from the head mounted display HM in the first embodiment in content of guide image data stored in the storing unit 120 in advance and content of region determination processing.

B-2. Region Determination Processing

Figure 9:
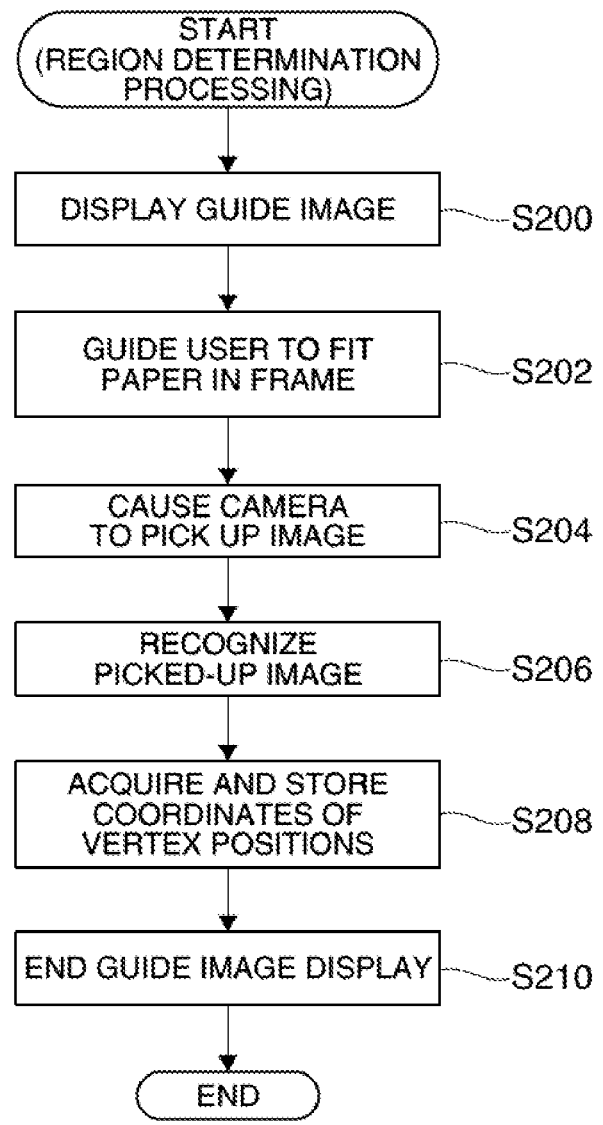
FIG. 9 is a flowchart for explaining a procedure of region determination processing in a second embodiment.
Figure 10A:
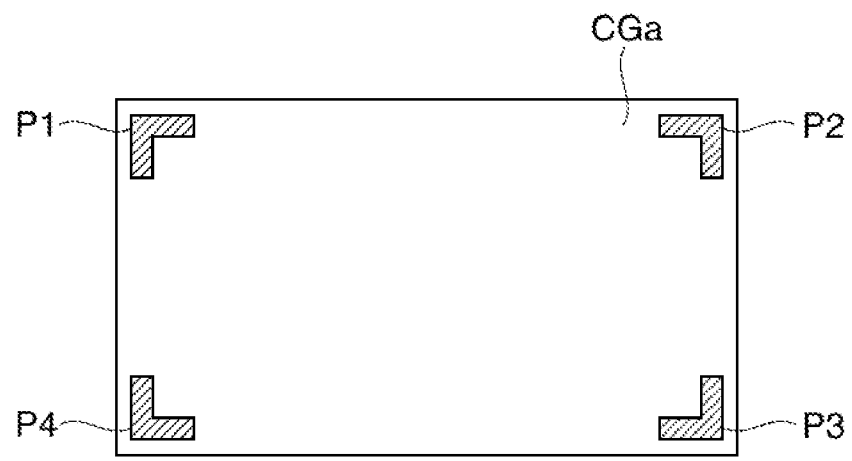
FIGS. 10A and 10B are explanatory diagrams for explaining the region determination processing in the second embodiment.
Figure 10B:
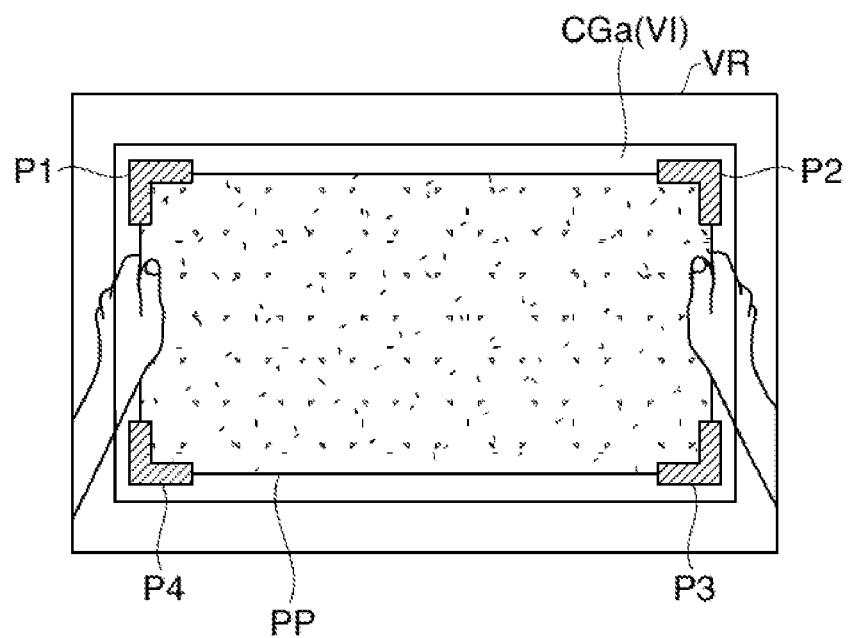

FIG. 9 is a flowchart for explaining a procedure of the region determination processing in the second embodiment. FIGS. 10A and 10B are explanatory diagrams for explaining the region determination processing in the second embodiment. Like the region determination processing in the first embodiment, the region determination processing in the second embodiment is processing executed by the AR processing unit 142a prior to AR processing and is processing for determining an analysis range in "analyzing an outside scene image" in the AR processing.

First, the AR processing unit 142a causes the image display unit 20 to display a guide image (step S202). FIG. 10A is an explanatory diagram showing an example of a guide image CGa. The guide image CGa is an image for showing an end portion of a display region of a virtual image to a user of the head mounted display HMa. The guide image CGa in this embodiment is an image that has a rectangular shape having an aspect ratio same as an aspect ratio of the right LCD 241 and the left LCD 242 (display elements) and has a background of single color of white. The guide image CG has frame-like guide marks P1 to P4 at four corners. Image data of the guide image CGa is stored in the storing unit 120 in advance.

In step S200, the AR processing unit 142a reads out guide image data stored in the storing unit 120 and transmits the guide image data to the image processing unit 160. The image processing unit 160 that receives the guide image data executes the processing explained with reference to FIG. 3. The guide image CGa shown in FIG. 10A is displayed in the visual field VR of the head mounted display HMa as the virtual image VI.

In step S202, the AR processing unit 142a guides the user to fit paper in a frame of the guide image CGa displayed as the virtual image VI. A guiding method may be a message displayed using a dialog box or the like or may be guidance by sound.

FIG. 10B shows a state in which the user fits paper PP in the guide marks P1 to P4 of the guide image CGa displayed in the visual field VR of the user as the virtual image VI. In FIG. 10B, for convenience of illustration, the outside scene SC transmitted through the optical-image display unit is not shown. After guiding the user, in step S204 in FIG. 9, the AR processing unit 142a causes the camera 61 to pick up an outside scene image.

In step S206, the AR processing unit 142a recognizes the picked-up outside scene image and specifies a boundary between the paper and the outside scene. The AR processing unit 142a acquires coordinates of positions of vertexes of a rectangle in the specified boundary and stores the coordinates in the coordinate-information storing unit 122 (step S208). Thereafter, the AR processing unit 142a transmits a request for ending the display of the guide image to the image processing unit 160 and the display control unit 190 (step S210) and ends the processing.

As explained above, in the region determination processing in the second embodiment, as in the region determination processing in the first embodiment, the AR processing unit 142a (the augmented-reality processing unit) can acquire the overlapping region where the image pickup region of the camera 61 (the image pickup unit) and the display region for the virtual image VI overlap. Therefore, in the configuration in the second embodiment, it is possible to obtain an effect same as the effect in the first embodiment.

Further, the AR processing unit 142a (the augmented-reality processing unit) guides the user to show an indicator by arranging an object (e.g., paper) having rectangular-shaped sides to be fit in the frame of the guide marks P1 to P4. Therefore, it is possible to give the indicator to the display region for the virtual image VI with single operation.

C. Third Embodiment

In a third embodiment of the invention, a configuration in which depth acquisition processing can be executed in addition to the region determination processing is explained. The depth acquisition processing is processing for acquiring "depth information" of an external environment. The depth acquisition processing is executed by an AR processing unit 142b. The AR processing unit 142b can realize augmented reality taking into account the depth of the external environment by using the acquired depth information during generation of additional image data in the AR processing. In the following explanation, only components having configurations and operations different from the configurations and operations in the first embodiment are explained. In the figures, components same as the components in the first embodiment are denoted by reference numerals and signs same as the reference numerals and signs in the first embodiment. Detailed explanation of the components is omitted.

C-1. Configuration of a Head-Mounted Display Device

Figure 11:
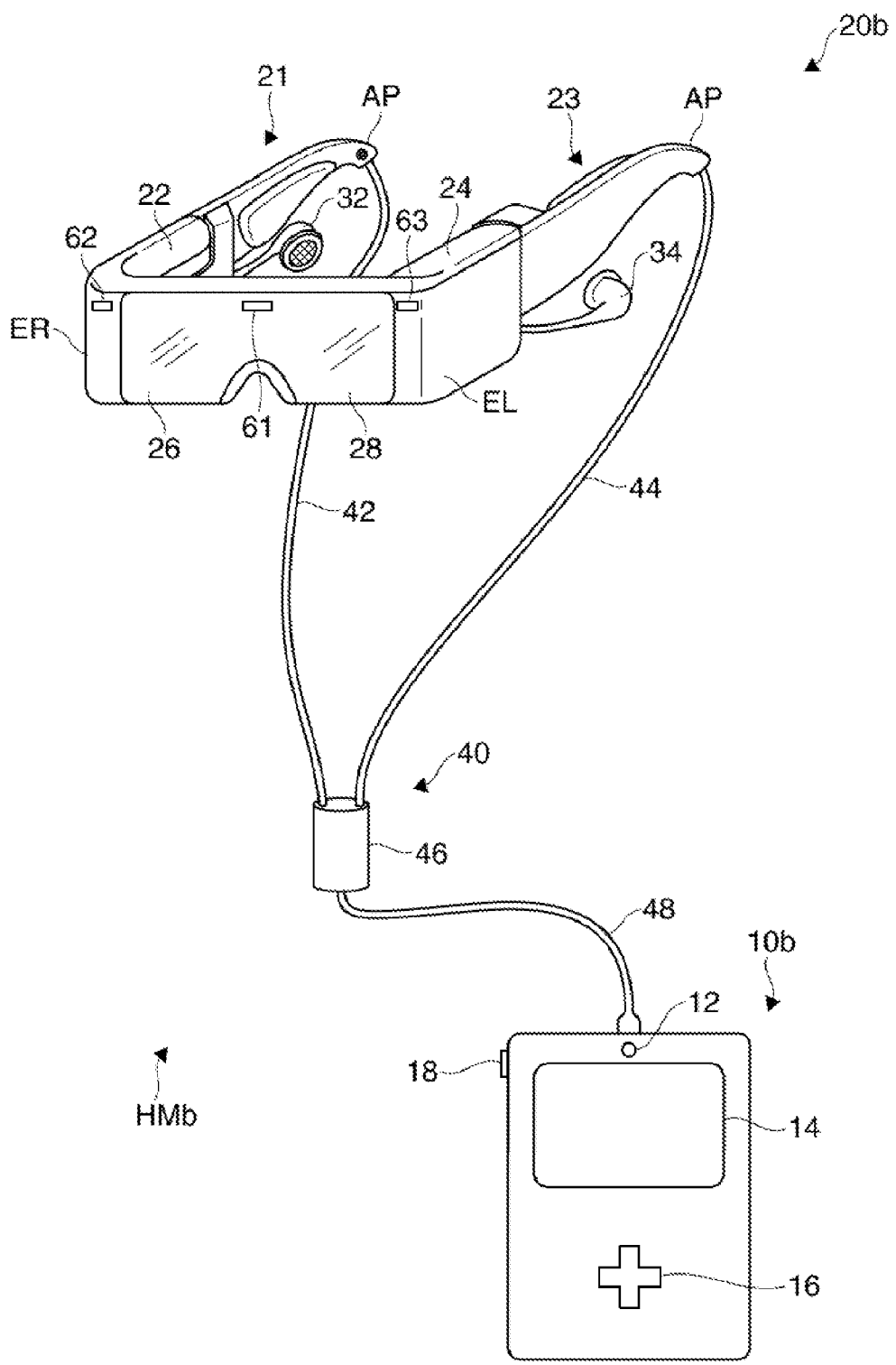
FIG. 11 is an explanatory diagram showing the configuration of the external appearance of the head-mounted display device in a third embodiment.

FIG. 11 is an explanatory diagram showing the configuration of the external appearance of a head-mounted display device in the third embodiment. The head-mounted display device in the third embodiment is different from the head-mounted display device in the first embodiment shown in FIGS. 1A to 5 (in particular, FIG. 2) in that the head-mounted display device in the third embodiment includes a control unit 10b instead of the control unit 10 and includes an image display unit 20b instead of the image display unit 20. The control unit 10b includes the AR processing unit 142b instead of the AR processing unit 142. The AR processing unit 142b executes the depth acquisition processing in addition to the region determination processing explained in the first embodiment. The image display unit 20b further includes a camera 62 and a camera 63.

The camera 62 is arranged in a position corresponding to the right eye or temple of the user or the periphery of the eye or the temple during wearing of a head mounted display HMb. The camera 63 is arranged in a position corresponding to the left eye or temple of the user or the periphery of the eye or the temple during wearing of the head mounted display HMb. Like the camera 61, the camera 62 and the camera 63 pick up images of an outside scene in a direction on the opposite side of the side of the eyes of the user and acquire outside scene images. The outside scene images picked up by the camera 62 and the camera 63 are used in the depth acquisition processing explained below. In this embodiment, the camera 62 is equivalent to the "second image pickup unit" and the camera 63 is equivalent to the "third image pickup unit".

C-2. Region Determination Processing

A procedure of the region determination processing in the third embodiment is the same as the procedure in the first embodiment explained with reference to FIGS. 9 and 10.

C-3. Depth Acquisition Processing

Figure 12:
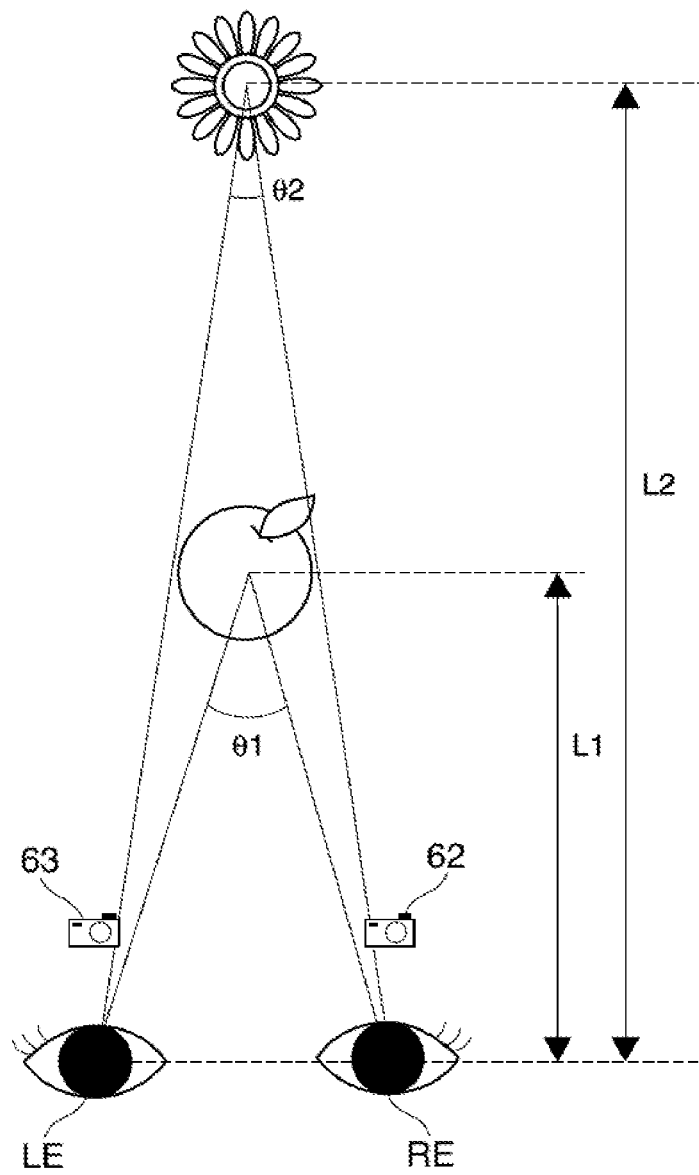
FIG. 12 is an explanatory diagram for explaining depth information acquired in depth acquisition processing.

FIG. 12 is an explanatory diagram for explaining depth information acquired in the depth acquisition processing. The depth information is information concerning the depth of an object present in an external environment of the user who wears the head mounted display HMb. For example, as shown in FIG. 12, when the user of the head mounted display HMb sees an apple present in front of the user, there is a difference between images seen by the right eye RE and the left eye LE of the user. In the following explanation, the difference is referred to as "binocular parallax". The binocular parallax is represented as angle of convergence $\theta 1$ formed by the apple and the right eye RE and the left eye LE of the user. Since the binocular parallax occurs, the user can sense the depth of the apple.

On the other hand, when the user of the head mounted display HMb sees a flower present farther away than the apple, an angle of convergence $\theta 2$ formed by the flower and the right eye RE and the left eye LE of the user is smaller than the angle of convergence $\theta 1$. That is, in FIG. 12, when the distance between both the eyes of the user and the apple is represented as depth distance L1 and the distance between both the eyes of the user and the flower is represented as depth distance L2, the binocular parallaxes $\theta 1$ and $\theta 2$ and the depth distances L1 and L2 satisfy relations $\theta 1 > \theta 2$ and $L1 < L2$. In other words, the size of a binocular parallax $\theta$ is inversely proportional to a depth distance L between both the eyes of the user and an object. Therefore, in the depth acquisition processing, as the "depth information", at least one of the binocular parallax $\theta$ and the depth distance L is acquired.

Figure 13:
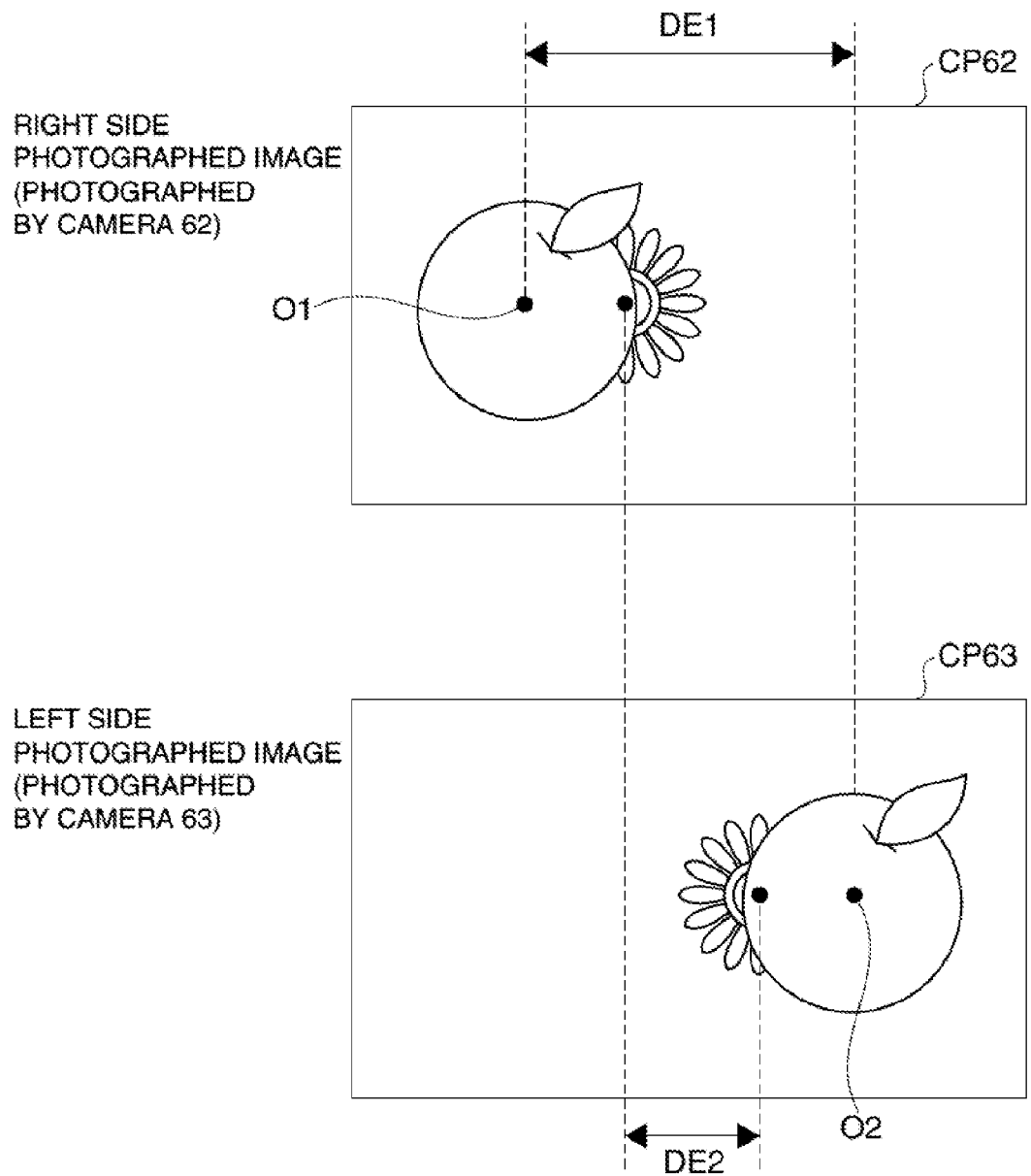
FIG. 13 is an explanatory diagram for explaining the depth acquisition processing.

FIG. 13 is an explanatory diagram for explaining the depth acquisition processing. In the depth acquisition processing, first, the AR processing unit 142*b* causes each of the camera 62 and the camera 63 to respectively pick up an outside scene image. The upper part of FIG. 13 shows an outside scene image CP62 picked up by the camera 62 provided in a position corresponding to the right eye of the user. The lower part of FIG. 13 shows an outside scene image CP63 picked up by the camera 63 set in a position corresponding to the left eye of the user. The AR processing unit 142*b* recognizes each of the outside scene image CP62 and the outside scene image CP63 picked up by the cameras 62 and 63 and specifies each of reference points concerning a specific object included in both the images. The reference point is a point set as a reference for specifying the position of an object. The reference point can be arbitrarily set. The reference point can be, for example, the center point of the object.

The AR processing unit 142*b* calculates a shift amount between the reference point in the outside scene image CP62 and the reference point in the outside scene image CP63. Thereafter, the AR processing unit 142*b* calculates the binocular parallax $\theta$ or the depth distance L from the calculated shift amount using a table or the like that sets a correspondence relation between the shift amount and the binocular parallax $\theta$ (or the depth distance L). As the shift amount is larger, the binocular parallax $\theta$ is larger and the depth distance L is smaller.

For example, in an example shown in FIG. 13, the AR processing unit 142*b* specifies a center point O1 of the apple included in the outside scene image CP62 and a center point O2 of the apple included in the outside scene image CP63 and calculates a shift amount DE1 between the center point O1 and the center point O2. The AR processing unit 142*b* calculates the binocular parallax $\theta$ (or the depth distance L) from the shift amount DE1 using the table or the like.

As explained above, according to the third embodiment, the AR processing unit 142*b* (the augmented-reality processing unit) can calculate a shift amount between a specific object included in the outside scene image CP62 (the second outside scene image) picked up by the camera 62 (the second image pickup unit) arranged in a position corresponding to the right eye or temple of the user or the periphery of the eye or the temple during wearing of the head mounted display HMb (the head-mounted display device) and a specific object included in the outside scene image CP63 (the third outside scene image) picked up by the camera 63 (the third image pickup unit) arranged in a position corresponding to the left eye or temple of the user or the periphery of the eye or the temple during wearing of the head mounted display HMb and acquire information concerning the depth of the object in an external environment from the calculated shift amount. As a result, the AR processing unit 142*b* can provide virtual reality using the information concerning the depth of the object in the AR processing.

D. Modifications

The invention is not limited to the examples and the embodiments explained above and can adopt various configurations without departing from the spirit of the invention. For example, the functions realized by the software may be realized by hardware. Besides, modifications explained below are possible.

D1. Modification 1

In the embodiments, the configuration of the head mounted display is illustrated. The configuration of the head mounted display can be arbitrarily decided without departing from the spirit of the invention. For example, addition, deletion, conversion, and the like of the components can be performed.

In the embodiments, for convenience of explanation, the control unit includes the transmitting units and the image display unit includes the receiving units. However, both of the transmitting units and the receiving units in the embodiments have a function for enabling bidirectional communication and can function as transmitting and receiving units.

For example, the connecting unit may be removed and the control unit and the image display unit may be configured to be capable of performing radio communication. Specifically, the control unit further includes a first radio communication unit and the image display unit further includes a second radio communication unit and a power supply. In this case, the first radio communication unit functions as the transmitting unit in the embodiments and the second radio communication unit functions as the receiving unit in the embodiments.

For example, the configurations of the control unit and the image display unit shown in FIG. 2 can be arbitrarily changed. Specifically, the touch pad may be removed from the control unit and the control unit may be configured to be operated by only the cross key. The control unit may include another interface for operation such as a stick for operation. The control unit may be configured such that devices such as a keyboard and a mouse can be connected thereto. The control unit may receive inputs from the keyboard and the mouse. A communication unit employing Wi-Fi (wireless fidelity) or the like may be provided in the control unit.

For example, the control unit shown in FIG. 2 is connected to the image display unit via a wired signal transmission line. However, the control unit and the image display unit may be connected via a wireless signal transmission line such as a wireless LAN, infrared communication, or Bluetooth (registered trademark).

For example, in the embodiments, the head mounted display is the transmissive head mounted display of the binocular type. However, the head mounted display may be a head mounted display of a monocular type. The head mounted display may be configured as a non-transmissive head mounted display with which transmission of an outside scene is blocked in a state in which the user wears the head mounted display. In the case of the non-transmissive head mounted display, the AR processing unit generates new additional image data obtained by superimposing an outside scene image and an additional image and the image processing unit causes the image display unit to display the new additional image data.

For example, the functional units such as the image processing unit, the display control unit, the AR processing unit, and the sound processing unit are explained as being realized by the CPU expanding the computer program, which is stored in the ROM or the hard disk, on the RAM and executing the computer program. However, the functional units may be configured using an ASIC (Application Specific Integrated Circuit) designed to realize the functions of the functional units.

For example, in the embodiments, the image display unit of the head mounted display is worn like eyeglasses. However, the image display unit may be a normal flat display device (a liquid crystal display device, a plasma display device, an organic EL display device, etc.). In this case, the control unit and the image display unit may be connected via a wired signal transmission line or may be connected via a wireless signal transmission line. Consequently, it is also possible to use the control unit as a remote controller for the normal flat display device.

Instead of the image display unit worn like eyeglasses, an image display unit having another shape such as an image display unit worn like a cap may be adopted as the image display unit. Further, an ear-hang type or a headband type may be adopted as the earphones.

For example, in the embodiments, the secondary battery is used as the power supply. However, the power supply is not limited to the secondary battery. Various batteries can be used. For example, a primary battery, a fuel battery, a solar battery, a thermal battery, and the like may be used.

D2. Modification 2

In the embodiments, the examples of the guide image are explained. However, the guide image is not limited to the illustration in the embodiments. Various modifications of the guide image are possible.

For example, in the first embodiment (FIGS. 7A and 7B), the rectangular image including the circular guide marks in the portion located at the four corners and the intersection of the diagonal lines is explained as an example of the guide image. However, the guide image may be a rectangular image including guide marks only in two places (e.g., two points on the diagonal lines) among the four corners. Further, for example, the shape of the guide marks does not have to be circular. A polygon, a pictorial symbol such as a character, an icon, and the like may be adopted.

For example, in the second embodiment (FIGS. 10A and 10B), the rectangular image including the frame-like guide marks at the four corners is explained as an example of the guide image. However, for example, the guide image may be a rectangular image including frame-like guide marks only in two places (e.g., two points on the diagonal lines) among the four corners. For example, the guide image may be an image including frame-like guide marks that surround all the four sides of a rectangle. Further, for example, the shape of the guide marks does not have to be frame-like.

D3. Modification 3

In the embodiments, the examples of the region determination processing are explained. However, the procedures of the processing shown in FIGS. 6 and 9 are only examples. Various modifications of the procedures are possible. For example, a part of the steps may be omitted or other steps may be added. The order of the steps to be executed may be changed.

For example, in the region determination processing shown in FIG. 6, the fingertip of the user is used as the "predetermined indicator". However, an arbitrary object can be adopted as the indicator. For example, an object having a tapered shape such as a pen point or a pointer can be used.

For example, in the region determination processing shown in FIG. 6, the AR processing unit repeats, by the number of guide marks, a series of processing for guiding the user to point at the guide mark, acquiring an outside scene image, acquiring a coordinate of a fingertip position, and storing the coordinate. However, the region determination processing may be a flow of processing for sequentially guiding the user to point at the guide marks and, after temporarily acquiring outside scene images for all the guide marks, acquiring coordinates of fingertip positions respectively from an acquired plurality of outside scene images and storing the coordinates.

For example, in the region determination processing shown in FIG. 9, the paper is used as the "predetermined indicator". However, an arbitrary object can be adopted as the indicator as long as the object has rectangular sides. For example, a celluloid sheet, a notebook, a box, or a book may be used.

D4. Modification 4

In the embodiments, the examples of the depth acquisition processing are explained. However, the procedure of the processing shown in FIGS. 12 and 13 are only examples. Various modifications of the procedures are possible.

D5. Modification 5

In the embodiments, the image-light generating unit is configured using the backlights, the backlight control units, the LCDs, and the LCD control units. However, the form explained above is only illustration. The image-light generating unit may include components for realizing another system together with these components or instead of these components.

For example, the image-light generating unit may include an organic EL (Electro-Luminescence) display and an organic-EL control unit. For example, the invention can be applied to a head-mounted display device of a laser retinal projection type as well.

D6. Modification 6

Among the constituent elements in the embodiments and the modifications, the constituent elements other than the constituent elements corresponding to the components described in the independent claims in claims are additional elements and can be omitted.

The entire disclosure of Japanese Patent Application No. 2012-050481, filed Mar. 7, 2012 is expressly incorporated by reference herein.

What is claimed is:

1. A head-mounted display device with which a user can visually recognize a virtual image and an outside scene simultaneously, the head-mounted display device comprising:
    a first image pickup unit configured to acquire a first outside scene image, the first image pickup unit being arranged in a position between a right eye and a left eye of the user;
    a second image pickup unit configured to acquire a second outside scene image and arranged in a position corresponding to the right eye or a right temple of the user or a periphery of the right eye or the right temple during wearing of the head-mounted display device by the user;
    a third image pickup unit configured to acquire a third outside scene image and arranged in a position corresponding to the left eye or a left temple of the user or a periphery of the left eye or the left temple during wearing of the head-mounted display device by the user;
    an augmented-reality processing unit configured to analyze the acquired first, second, and third outside scene images and generate additional image data for augmented reality according to a result of the analysis;
    a display element configured to generate image light using the generated additional image data;
    a light guide unit configured to form a virtual image before the eyes of the user using the generated image light; and
    a storing unit having stored therein guide image data for showing a display region for the virtual image to the user, the guide image data having a rectangular shape and including a plurality of guide marks arranged in each of a plurality of corners of the guide image data, wherein
        the augmented-reality processing unit acquires an overlapping region where the display region for the virtual image and an image pickup region of the first image pickup unit overlap in the first outside scene image and generates the additional image data using the overlapping region,
        in acquiring the overlapping region, the augmented-reality processing unit causes the display element to generate image light using the guide image data, guides the user to indicate positions of each of the plurality of guide marks in a given sequence, causes the first image pickup unit to acquire the first outside scene image, and acquires, as a boundary between the overlapping region and other regions, the positions indicated by the user obtained by analyzing the acquired first outside scene image,
        the augmented-reality processing unit generates the additional image data for augmented reality display in both the overlapping region and a region outside of the overlapping region based on the analysis of the first, second, and third outside scene images,
        the additional image data generated for display in the overlapping region by the display element is displayed to be recognized by a user of the head-mounted display device, and
        the additional image data generated for the region outside of the overlapping region is indicated to be present outside the overlapping region by displaying an icon indicating presence of the additional image data outside of the overlapping region.

2. The head-mounted display device according to claim 1, wherein
    the plurality of guide marks includes a guide mark arranged in each of a plurality of corners of the guide image data and a guide mark arranged in a center of the guide image data.

3. The head-mounted display device according to claim 1, wherein
    the augmented-reality processing unit guides the user to indicate positions of each of the plurality of guide marks in a given sequence by causing the display element to display a message instructing the user to indicate positions of each of the plurality of guide marks in order of the given sequence displayed in the message.

4. The head-mounted display device according to claim 1, further comprising:
    a sound processing unit that supplies a sound signal to the user,
    wherein the augmented-reality processing unit guides the user to indicate positions of each of the plurality of guide marks in a given sequence by causing the sound processing unit to supply a sound signal to the user instructing the user to indicate positions of each of the plurality of guide marks in order of the given sequence provided in the sound signal.

5. The head-mounted display device according to claim 1, wherein
    the display region is an entire region of the head-mounted display device where a virtual image can be displayed to the user wearing the head-mounted display device,
    a non-display region surrounds the display region, and
    the plurality of guide marks are arranged in each of the plurality of corners of the guide image data such that the plurality of guide marks are positioned at the boundary between the display region and the non-display region.

6. The head-mounted display device according to claim 1, wherein
    the augmented-reality processing unit further specifies a center point of a specific object in an external environment as a reference point and calculates a shift amount between the center point of the specific object included in the second outside scene image and the center point of the specific object included in the third outside scene image and acquires information concerning depth of the specific object in the external environment based on the calculated shift amount.

7. A control method for a head-mounted display device with which a user can visually recognize a virtual image and an outside scene simultaneously, the control method comprising:
    acquiring a first outside scene image from a first image pickup unit arranged in a position between a right eye and a left eye of the user;
    acquiring a second outside scene image from a second image pickup unit arranged in a position corresponding to the right eye or a right temple of the user or a periphery of the right eye or the right temple during wearing of the head-mounted display device by the user;
    acquiring a third outside scene image from a third image pickup unit arranged in a position corresponding to the left eye or a left temple of the user or a periphery of the left eye or the left temple during wearing of the head-mounted display device by the user;

analyzing the acquired first, second, and third outside scene images and generating additional image data for augmented reality according to a result of the analysis;

generating image light using the generated additional image data;

forming a virtual image before the eyes of the user using the generated image light; and storing guide image data for showing a display region for the virtual image to the user, the guide image data having a rectangular shape and including a plurality of guide marks arranged in each of a plurality of corners of the guide image data, wherein in the generating the additional image data, an overlapping region where the display region for the virtual image and an image pickup region for acquiring the first outside scene image overlap in the first outside scene image is acquired and the additional image data is generated using the overlapping region, the overlapping region is acquired by generating the guide image data, guiding the user to indicate positions of each of the plurality of guide marks in a given sequence, causing the first image pickup unit to acquire the first outside scene image, and acquiring, as the boundary between the overlapping region and other regions, the positions indicated by the user obtained by analyzing the acquired first outside scene image, in generating the additional image data, the additional image data is generated for augmented reality display in both the overlapping region and a region outside of the overlapping region based on the analysis of the first, second, and third outside scene images, the additional image data generated for display in the overlapping region is displayed to be recognized by a user of the head-mounted display device, and the additional image data generated for the region outside of the overlapping region is indicated to be present outside the overlapping region by displaying an icon indicating presence of the additional image data outside of the overlapping region.

8. A head-mounted display device with which a user can visually recognize a virtual image and an outside scene simultaneously, the head-mounted display device comprising:

a first image pickup unit configured to acquire a first outside scene image, the first image pickup unit being arranged in a position between a right eye and a left eye of the user;

a second image pickup unit configured to acquire a second outside scene image and arranged in a position corresponding to the right eye or a right temple of the user or a periphery of the right eye or the right temple during wearing of the head-mounted display device by the user;

a third image pickup unit configured to acquire a third outside scene image and arranged in a position corresponding to the left eye or a left temple of the user or a periphery of the left eye or the left temple during wearing of the head-mounted display device by the user;

an augmented-reality processing unit configured to analyze the acquired first, second, and third outside scene images and generate additional image data for augmented reality according to a result of the analysis;

a display element configured to generate image light using the generated additional image data;

a light guide unit configured to form a virtual image before the eyes of the user using the generated image light; and a storing unit having stored therein guide image data for showing a display region for the virtual image to the user, the guide image data having a rectangular shape and including frame-like guide marks arranged in at least two places among four corners of the guide image data, wherein the augmented-reality processing unit acquires an overlapping region where the display region for the virtual image and an image pickup region of the first image pickup unit overlap in the first outside scene image and generates the additional image data using the overlapping region, causes the display element to generate image light using the guide image data, guides the user to hold a rectangular-shaped object in front of the head-mounted display device in an area where the rectangular-shaped object may be picked-up by the first image pickup unit, and guides the user to arrange the rectangular-shaped object to appear inside the frame-like guide marks in the display region for the virtual image, such that four corners of the rectangular shaped object correspond with the frame-like guide marks from the perspective of the user, causes the first image pickup unit to acquire the first outside scene image, and acquires, as a boundary between the overlapping region and other regions, a position of the rectangular-shaped object positioned inside the frame-like guide marks obtained by analyzing the acquired first outside scene image.

* * * * *